United States Patent
Anderson et al.

(10) Patent No.: US 6,441,833 B1
(45) Date of Patent: Aug. 27, 2002

(54) DYNAMICALLY SPECIFYING INVOCATIONS IN COMPILED OBJECTS

(75) Inventors: John Scott Anderson, Shrewsbury; Charles Douglas Blewett, Madison, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 1366 days.

(21) Appl. No.: 08/741,419

(22) Filed: Oct. 29, 1996

Related U.S. Application Data

(63) Continuation of application No. 08/172,525, filed on Dec. 20, 1993, now abandoned.

(51) Int. Cl.[7] ............................ G09G 5/00; G06F 9/00
(52) U.S. Cl. .................................... 345/762; 709/331
(58) Field of Search ............................. 395/333, 334, 395/335, 339, 340, 342, 346, 348, 683, 685; 345/333, 334, 335, 339, 340, 342, 346, 348, 700, 744, 764, 762, 765, 781, 788, 804, 835; 709/315, 331, 332

(56) References Cited

U.S. PATENT DOCUMENTS

| | | | | |
|---|---|---|---|---|
| 5,041,992 A | * | 8/1991 | Cunningham et al. ...... | 345/641 |
| 5,301,270 A | * | 4/1994 | Steinberg et al. ........... | 345/866 |
| 5,327,529 A | * | 7/1994 | Fults et al. .................. | 345/762 |
| 5,335,320 A | * | 8/1994 | Iwata et al. .................. | 717/110 |
| 5,353,401 A | * | 10/1994 | Iizawa et al. ................ | 345/763 |
| 5,418,964 A | * | 5/1995 | Conner et al. ............... | 709/316 |
| 5,428,792 A | * | 6/1995 | Conner et al. ............... | 717/143 |
| 5,437,025 A | * | 7/1995 | Bale et al. ............... | 707/103 R |
| 5,600,778 A | * | 2/1997 | Swanson et al. ............. | 345/762 |
| 5,603,034 A | * | 2/1997 | Swanson ..................... | 717/111 |
| 5,659,751 A | * | 8/1997 | Heninger ..................... | 709/332 |

FOREIGN PATENT DOCUMENTS

EP  A-0-546-684  6/1993

OTHER PUBLICATIONS

McCormack et al., "Using the X Toolkit or How to Write a Widget," Submitted to USENIX, summer 1988, pp. 1–12.*
Rosenthal, "Going for Baroque," UNIX Review, Jun. 1988, pp. 71–79.*
Tonouchi et al., "Creating Visual Objects by Direct Manipulation," Visual Languages, 1992 IEEE Workshop, pp. 95–101.*
"Recording Virtual Function Table Offsets in External Variables", IBM Technical Disclosure Bulletin, vol., 33, No. 8, Jan. 1, 1991.
J. M. Vlissides, et al., "Unidraw: A Framework for Building Domain–Specific Graphical Editors", ACM Siggraph Symposium on User Interface Software and Technology, Oct. 1989, pp. 158–167.

(List continued on next page.)

*Primary Examiner*—Crescelle N. dela Torre
(74) *Attorney, Agent, or Firm*—Oliff & Berridge

(57) ABSTRACT

Apparatus for specifying invocations in compiled objects at runtime. One species of the apparatus is a drawing widget for use in the X Window System. The drawing widget permits users to specify elements in the window corresponding to the widget by providing a sequence of invocations of X Window graphics functions to the widget at runtime. A resource in the drawing widget is set to the sequence of invocations and when the corresponding window is exposed, the invocations in the sequence are executed to produce the elements in the window. The sequence of function invocations may include invocations for functions which add or remove elements from the window and which translate, rotate, or scale elements. Other features include the use of unit coordinates in the invocation and the use of hashing to reduce the character-string invocations provided in the sequence to representations made up of small integer, pointer, and floating-point data.

25 Claims, 8 Drawing Sheets

OTHER PUBLICATIONS

*X–Window System*, C Library and Protocol Reference, R. W. Scheifler J. Gettys, R. Newman, Digital Press, pp. 94–106 and 118–166, 1988.

*Postscript Language*, Tutorial and Codebook, Adobe Systems, Inc., Addison–Wesley Publishing Company, Inc., pp. 47–50, 1991.

*X Window System Toolkit*, The Complete Programmer's Guide and Specification, P.J. Asente & R. R. Swick, Digital Press, pp. 13–43, 91–95 and 117–153, 1990.

*InterViews Reference Manual Version 3.0.1*, M. A. Linton, P. R. Calder, J. A. Interrante, S. Tang, J. M. Vlissides, pp. 0–2–8–8, Oct. 4, 1991.

* cited by examiner

OBJECT LIST ENTRY 509

GFIE 509

ARGUMENT LIST 621

GCIE 519

DYNAMICALLY SPECIFYING INVOCATIONS IN COMPILED OBJECTS

This is a Continuation of application No. 08/172,525 filed Dec. 20, 1993, now abandoned.

BACKGROUND OF THE INVENTION

1. Field of the Invention

The invention concerns object-oriented programming systems in general and object-oriented programming systems for generating graphical displays in particular.

2. Description of the Prior Art

Sharp declines in the cost of memory and processing power has made it possible for even low-cost computer systems to provide graphical user interfaces to their users. In typical systems with graphical user interfaces, the display is divided into a number of windows of varying sizes. Some of the windows show the output of programs being executed for the user; others display icons, menus, buttons, sliders, and the like. The user of the system can employ a pointing device such as a mouse to control the operation of the system by selecting icons or menu items or operating buttons or sliders and can employ a keyboard to input characters to windows.

While a graphical user interface makes it easier for a user to work with a program, the graphical user interface adds substantially to the program's complexity, and therefore to the difficulty of writing the program. Efforts to simplify the task of writing programs involving graphical user interfaces have led to the development of systems for programming graphical user interfaces. An example of such systems is the X Window System, described in Robert W. Scheifler, James Gettys, and Ron Newman, *X Window System, C Library and Protocol Reference*, Digital Press, 1988, and in Paul J. Asente and Ralph R. Swick, *X Window System Toolkit*, Digital Press, 1990(X Window System is a trademark of the Massachusetts Institute of Technology).

FIG. 1 shows a computer system 101 which employs the X Window System. The hardware components of computer system 101 are processor 121, memory 103, display 131, keyboard 137, and mouse 139. Mouse 139 controls the position of pointer 133 in display 131. Processor 121 is executing an application process 109 which is executing an application program 110. Application program 110 is displaying two windows 135, window 135(*a*) and window 135(*b*) in display 131. During execution, data and instructions flow between memory 103 and processor 121, as indicated by arrow 119 and outputs to display 131 flow from processor 121 to display 131, as indicated by arrow 123. Inputs flow from keyboard 137 and mouse 139 to processor 121 as indicated by arrows 125 and 129.

Application program 10 has been implemented using the X Window System; consequently, program 110 has four major components: application code 111, the specific code for the application program, and three components of the X Window System: widgets 113, Intrinsics 115, and XLIB library routines 117. The XLIB library routines are what actually cause windows and their contents to appear in display 131; when an XLIB library routine is executed by processor 121, processor 121 sends a message specifying an operation on display 131 to another component of the X Window System, server process 105, which executes X server code 107. Server process 105 responds to the message by performing the actual operations which produce the windows 135 in display 131. Server process 105 further detects events such as inputs from mouse 139 or keyboard 137 and sends messages specifying the events to application process 109, which responds to the event messages by executing callback functions (CBF) 112 code in application code 111.

While XLIB library routines can be invoked directly by application code 111, the library routines are still too low-level to permit easy programming of graphical user interfaces. To deal with this difficulty, the X Window System has provided programmers with a toolkit for programming in the system. Intrinsics 115 and widgets 113 belong to the toolkit FIG. 2 is an overview of a widget 201. Functionally, widgets 201 mediate between application code 111 and X server code 107. When application code 111 wants to change the state of a window associated with a widget, application code 111 writes values in the widget; in response to the change, widget 201 performs actions which result in messages being sent to X server 107 to change the state of the window. When X server code 107 receives an event concerning a window, X server code 107 sends the event to the widget 201 for the window. Widget 201 then performs the actions required for the event. Among the actions may be invocation of a callback function 112. Once a class of widgets has been defined, any application program to which the definition of the class is available may create and use widgets belonging to the class.

Widgets 201 are compiled objects. An object is a data structure and a set of functions which represent an entity manipulated by a computer program. The data structure represents the state of the entity. Some of the functions permit the program to write and read parts of the data structure; others of the functions respond to changes in the data structure. The functions associated with an object determine how the object behaves and thus determine the object's class (type). The classes of widgets 201 are hierarchical. If a class is below another class in the hierarchy, it inherits the characteristics of the class above it, and widgets belonging to the class have the inherited characteristics as well as those particular to its own class.

A compiled object is an object whose class and data structures are defined at compile time, that is, when the code which describes the object is compiled. Objects may also be interpreted; with such objects, the class and data structures of the object are defined at run time, that is, when the program using the object is executed. Compilation permits better type checking and more efficient code generation than interpretation, and consequently, systems using compiled objects are generally more efficient and have fewer bugs than systems using interpreted objects; however, compiled objects are generally less flexible. When a compiled object is created and used at run time, the values contained in the object's data structures may vary, and what happens when a function is executed may depend on the values in the data structures, but the data structures and functions themselves cannot change. In terms of widget 201, the fact that widget 201 is a compiled object means that widget 201 can be used only to represent the kind of window 135 corresponding to the widget's class, not to represent any window.

Returning to the details of widget 201, the hierarchy of classes appears in FIG. 2 as superclass field 203, which contains the name of the class of which widget 201 is a subclass. Widget 201 inherits all of the functions of the class specified in field 203, which inherits all of the functions specified for its superclass, and so on. Class 205 is the name of the widget's own class.

Methods 207 are functions which define the widget's class. All widgets belonging to a class employ the same methods 207 to carry out the operations which define the class. The methods may either be defined specifically for the class or inherited from classes higher up in the hierarchy. For example, windows are often hidden and exposed again in the course of operation of a windowing system, and consequently, most widget classes have methods which specify what is to be done when a window 135 associated with a widget belonging to the class is exposed. When a specific window is exposed, the widget for that window uses the expose method for its class to redraw the window. Of course, redrawing the window may require the method to call X functions in Intrinsics 115 and/or XLIB 117.

Resources 209 are values in widget 113 which represent the state of the widget. What resources a widget 113 has is determined by its class. The values of the resources are of course determined at run time. Both application code 111 and routines in methods 207 can read and set values in resources 209, and routines in methods 207 can respond to changes in values in resources 209 by calling X functions or by calling call back functions 112. The resources thus provide a way of communicating between application code 111 and the X Window System. For example, if a window 135 is to display a line of text, the application code 111 writes the line of text to a resource in the window's widget and a method in the widget reads the line from the resource and calls the X functions necessary to cause the line to be displayed in the window 135. Similarly, when pointer 133 is located in a window and the user of system 101 clicks a mouse button, X server 107 responds to the mouse click by sending an event message to widget 201 for the window. The arrival of the event message results in the execution of a method and the method may change a value in resources 209. If the change in the value requires that a callback function be executed, the method invokes the callback function, which can then examine the values in resources 209 and respond to the event accordingly.

Callback function specifiers 211 specify functions in callback functions 112. As just described, methods call callback functions when a change in the state of resources 209 so requires. The callback functions which application code 111 may provide for a widget 209 are of course determined by the widget's class. Intrinsics 115 are X Window System functions which permit programmers to define widgets and which implement the interfaces between application code 111 and a widget on one hand and between X server 107 and the widget on the other. For example, an intrinsic function invokes the method used by the widget to set its resources and another intrinsic function invokes methods used to deal with event messages from X server 107.

While programming systems like the X Window System have made it much easier to program for graphical user interfaces, they are less flexible than might be desired. One reason for their lack of flexibility is the fact that widgets are compiled objects. While compilation provides more efficient code and better type checking than is possible otherwise, there are many occasions where the characteristics of the window are not known until application program 110 is actually executed. For example, a program cannot use widgets as they are presently known to arrange arbitrary graphical elements in a window. The programmer must either provide a separate widget for each arrangement of elements or directly employ the much more difficult interface provided by XLIB 117. Similar problems arise in any system employing compiled objects. It is an object of the invention to provide a compiled widget which retains the advantages of compilation but which can be used to arrange arbitrary graphical elements in a window. The techniques employed in this drawing widget may be used generally to create compiled objects which retain the advantages of compilation but achieve a flexibility which has been heretofore possible only with interpreted objects.

SUMMARY OF THE INVENTION

In the invention, flexibility is gained by providing a sequence of at least one invocation of a function to a compiled object at runtime. The sequence is stored in the object, and the invocations in the sequence are executed at appropriate times.

The foregoing technique is employed in an illustrative embodiment to implement a drawing widget for the X Window System. A resource in the drawing widget specifies graphical elements to be drawn in the window represented by the widget. To draw an element in a window represented by a drawing widget, application code 111 first uses a routine in the Intrinsics to make a sequence of the invocations of primitive drawing functions in XLIB 117 which are required to draw the element in the window available to the widget. This is done for each element in the window. Then application code 111 uses another routine in the Intrinsics to invoke the method function in the drawing widget which sets the resource. The method function sets the resource 209 to the invocations in the sequence. The expose method for the widget then executes the invocations in the resource 209. As a result of the execution of the invocations, the elements appear in the window represented by the widget.

Of course application code 111 may obtain the sequence of invocations from a source external to application code 111, such as a file or a pipe connected to another process. Application code 111 may also provide invocations to the sequence in direct response to inputs from mouse 139 and/or keyboard 137 in the window in which the elements are being displayed, thus permitting interactive drawing in the window.

In a preferred embodiment, the resource may also be set to specify invocations of functions which scale, rotate, and translate the elements in the window represented by the widget. For ease of use, the invocations provided by application code 111 in a preferred embodiment are represented as character strings which specify the name of the function being invoked and the actual arguments used in the invocation. Efficient operation of the widget is ensured by translating the character strings into integer and floating point values when the resource is set.

Further advantages include the use of a unit coordinate system to represent coordinates in the invocations and invocations specifying scaling, rotation, and translation functions. A transform function converts the unit coordinates to the pixel coordinates used in the actual X Window graphics primitives. Scaling, rotation, and translation are done by specifying the amount of scaling, rotation, or translation as arguments in the relevant functions. The transform function then uses these arguments to compute the pixel coordinates from the unit coordinates. Scaling is also done whenever the dimensions of the window represented by the widget change. To ensure that changes to the resource are immediately reflected in the window, the method which sets the resource also redraws the window where necessary.

The foregoing and other objects and advantages of the invention will be apparent to one of ordinary skill in the art who peruses the following Drawing and Detailed Description, wherein:

Figure 1:
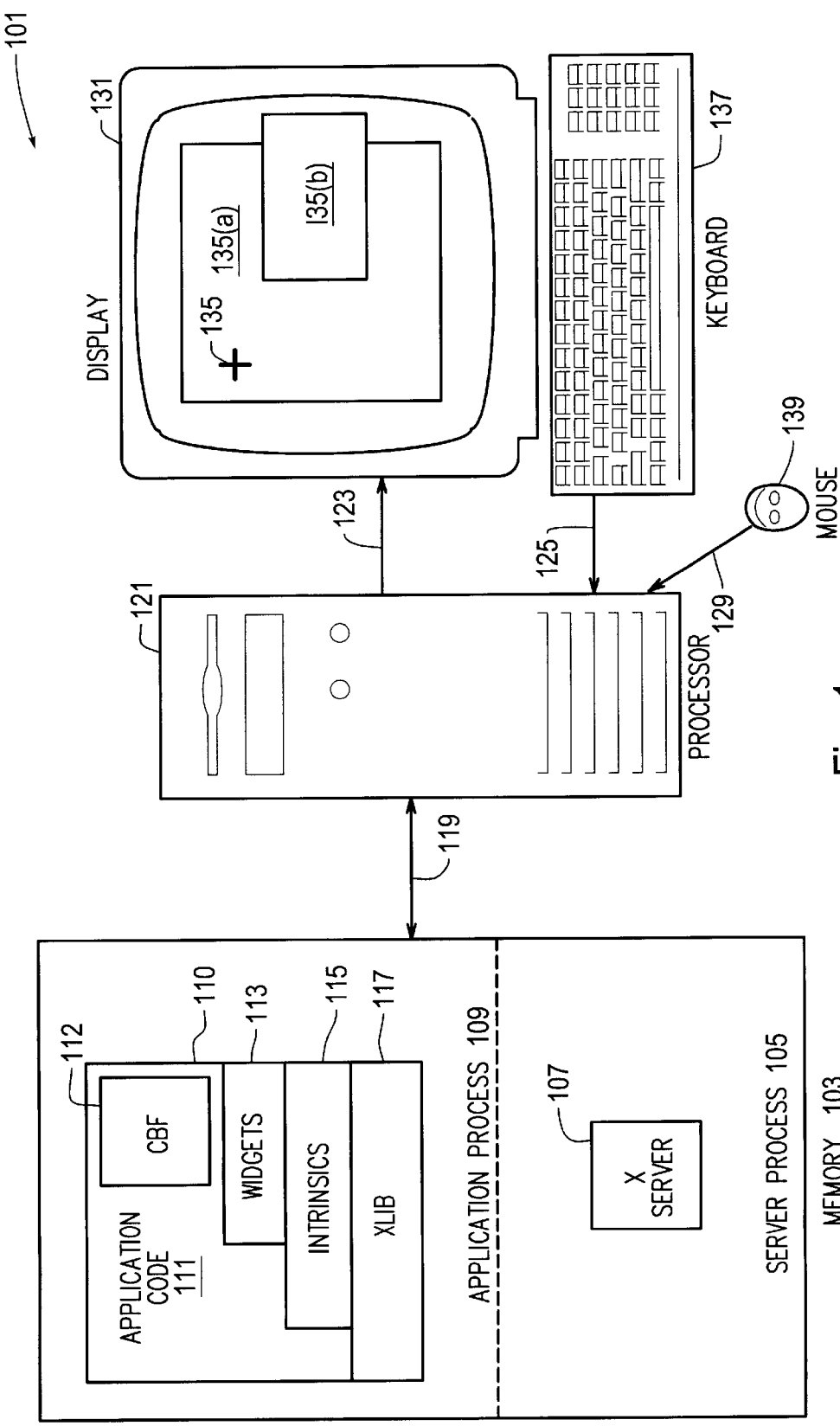
FIG. 1 is an overview of a prior-art computer system employing the X Window System.
Figure 2:
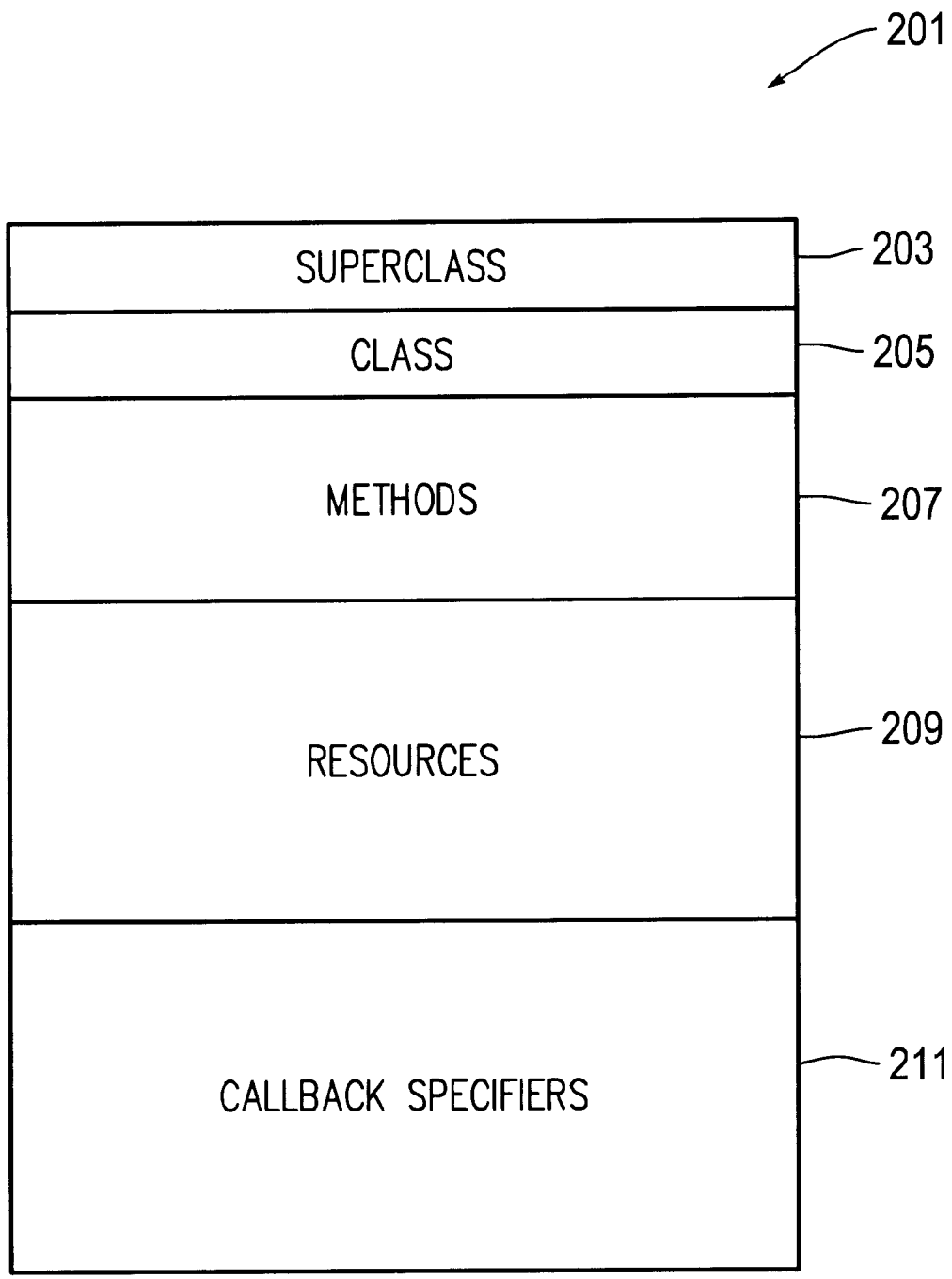
FIG. 2 is an overview of a prior-art X Window widget.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will describe a species of the invention, a drawing widget for use in the X Window System, in detail. The Detailed Description is to be read with the understanding that the drawing widget is only one of many possible objects which apply the principles of the invention. The Detailed Description will begin with examples of windows produced by the drawing widget of the invention, will continue with an overview of the structure and operation of the drawing widget, and will then disclose details concerning the implementation of the drawing widget in a preferred embodiment.

Figure 3:
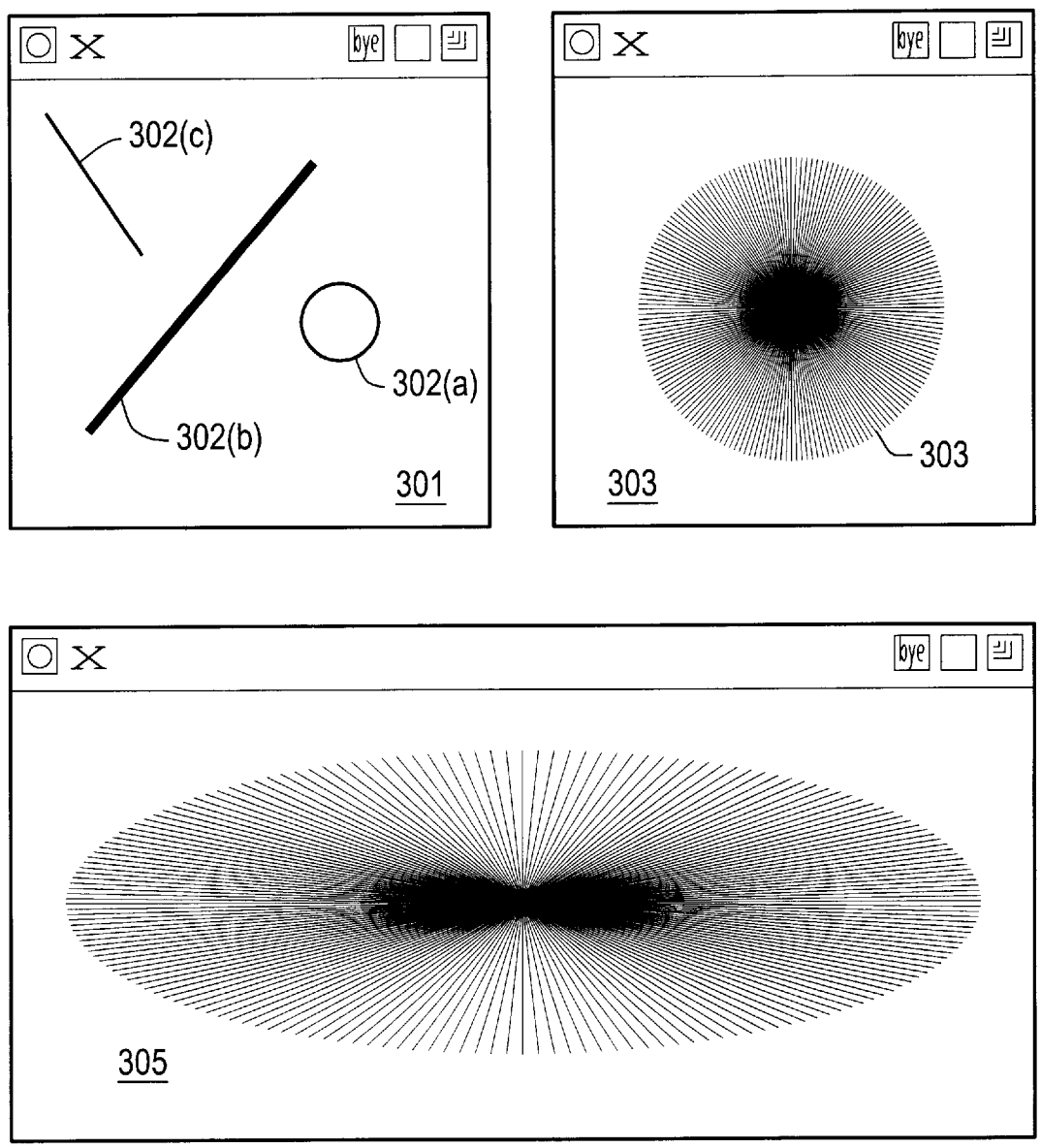
FIG. 3 shows example windows produced by drawing widgets.

Example Windows Produced by the Drawing Widget: FIG. 3

FIG. 3 shows three windows, window 301, window 303, and window 305, each of which is represented by a drawing widget. As is apparent from FIG. 3, drawing widgets are capable of producing arbitrary collections of graphics elements 302 in a window and of manipulating the elements. With prior-art widgets, the programmer would have had the choice of defining a separate widget class for each window and using the XLIB functions directly in the application program.

The contents of a window drawn by a drawing widget depend solely on the invocations which the application program provides the widget at run time. The application program provides the invocations by setting the drawing widget's resource to a sequence of invocations. In window 301, execution of the invocations provided by the application program produces the elements circle 302(*a*), heavy diagonal line 302(*b*), and light diagonal line 302(*c*). In windows 303 and 305, there is a single element 302 which is made up of 360 lines, each one rotated one degree with respect to its predecessor. The invocations which produced these windows were a succession of invocations which specified the line and then rotated the element by one degree. Window 305 was produced by resizing window 303; it could also have been produced by adding invocations of scaling functions to the sequence of invocations which produced window 303.

Figure 8:
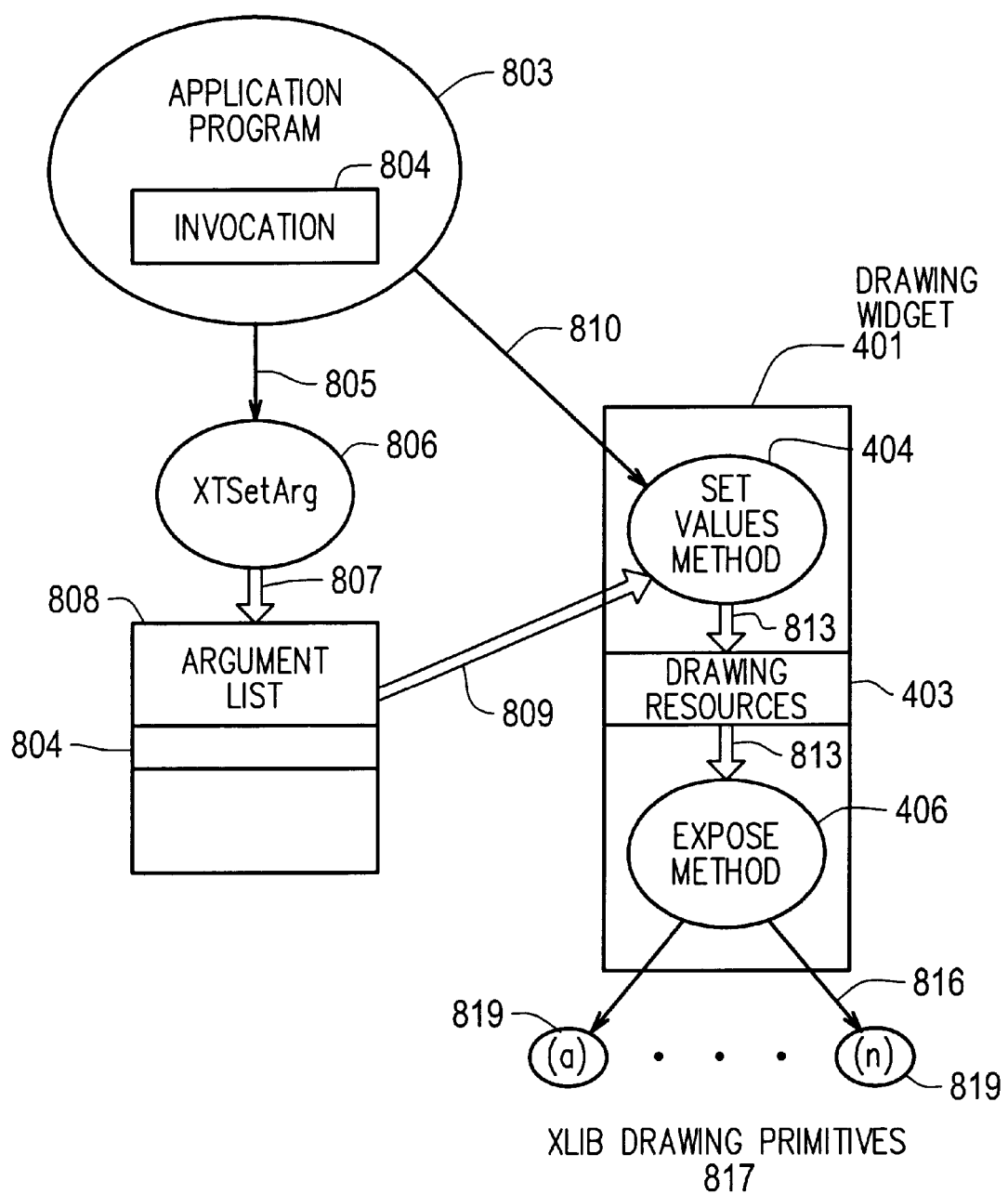
FIG. 8 provides an overview of the structure and operation of a drawing widget.

Overview of the Drawing Widget: FIG. 8

FIG. 8 provides an overview 801 of a drawing widget 401 as it is used by an application program 803. In FIG. 8 and elsewhere in this Specification, ovals indicate functions and rectangles indicate data; single arrows indicates calls and double arrows indicates flows of data. In the X Window System, an application program sets resources at run time by means of the XtSetArg and the XtSetValues Intrinsic functions. The application program uses XtSetArg to set up an argument list. When that is done, it invokes XtSetValues, which executes set value method 404. The method in turn uses the values in the argument list to set the resource.

In drawing widget 401, the resource which the application program sets is a list of invocations of functions. In the present context, an invocation is to be understood as a data item which represents a function and actual arguments for the function. Actual arguments are values which are used in the execution of the function. Once the resource has been set to the list of invocations, the invocations on the list are executed by drawing expose method 402 each time widget 401 receives an expose event for the window represented by widget 401. The invocations on the list may include invocations for any of the XLIB graphics functions, and consequently, an application program may do any graphics operation performed by those functions in the window.

As is apparent from the above, drawing widget 401 requires an argument list 808 which contains each invocation 804 needed to draw the window represented by drawing widget 401. Each addition of an invocation 804 to argument list 808 requires an invocation of XtSetArg 806 by application program 803. The sequence of invocations of xtsetArg required to define two diagonal blue lines follows:

```
i=0;
XtSetArg (args[i],
    XtNxCreateGC, "(blue-gc, GCLineWidth, 3,
    GCForeground, Blue)"
i++;
XtSetArg (args[i],
    XtNxDrawLine, "(blue-gc, .25, .25, .75, .75)"); i++;
XtSetArg (args[i],
    XtNxDrawLine, "(blue-gc, .25, .75, .75, .25)"); i++;
```

XtSetArg requires for its actual arguments a specification of an element in argument list 808, represented in the above fragment by args [i], and the value to be placed in the array element. Here, the value is of course the invocation for the drawing function. The invocation is represented by a character string which is the name of the function, for example, XtNxCreateGC, and a character string which is the list of actual arguments for the invocation, here "(blue-gc, GCLineWidth, 3, GCForeground, Blue)". As each invocation is added to argument list 808, the variable i is incremented by 1. In the preferred embodiment, the actual arguments are constants; in other embodiments, the actual arguments may be constants or variables.

There are two drawing functions specified in the above example. The XtNxCreateGC function creates a graphics context, an X Window System data structure which defines properties of the element being drawn. The arguments for the function represent values for the graphics context. In this case, the element is a line, so the invocation specifies a graphics context with the name (blue-gc) which specifies a line width of three and a line color of blue.

The XtNxDrawLine function draws a line. Its arguments specify the graphics context for the line (here blue-gc) and the coordinates of the ends of the line. Thus, each of the invocations of XtNxDrawLine specifies that a line will be drawn between the points indicated by the coordinates using the thickness and color specified by the graphics context. It should be noted here that the standard X Window System graphics functions take pixel coordinates; however, the invocations used in the preferred embodiment use unit coordinates. The origin of the unit coordinate system is the lower left-hand corner of each element's bounding box. As will be explained in more detail below, the drawing widget converts the unit coordinates in the invocations to pixel coordinates before the actual XLIB graphics functions are invoked.

Once the argument list has been set up, applications program 803 invokes the XtSetValues intrinsic function for widget 401, which in turn executes set values method 404 in widget 401. Set values method 404 uses the contents of argument list 808 to construct drawing resources 403 for the widget. The invocation of XtSetValues for the argument list described above looks like this:

XtSetValues (drawing, args, i);
drawing is the name of the drawing widget 401 whose resources are being set; args is the name of the array containing the values to be used to set the resources, and i specifies the number of elements containing values in the array.

As will be explained in more detail later, set values method 404 in a preferred embodiment constructs a resource which is a data structure in which each element of the window corresponding to the widget is represented by the list of invocations needed to draw the element. In order to speed up drawing the elements, the text strings of the original list of functions have been reduced to integers (representing names) and floating point values (representing numerical values). Expose method 406 for the widget then uses the resource to redraw the window whenever that is necessary. In redrawing the window, expose method 406 uses the information in drawing resources 403 to invoke the required XLIB drawing primitives 819 of the set of drawing primitives 817.

Detailed Implementation of Drawing Widget 401

The following discussion of the detailed implementation of drawing widget 401 begins with an overall discussion of how the elements of the window are specified, continues with a detailed discussion of the data structure used to represent the contents of the drawing window, and finally a detailed discussion of the set value method and its operation.

Specifying the Elements of a Window

As indicated above, a window corresponding to a drawing widget 401 contains one or more elements 302. Each element has a graphics context and is drawn by executing one or more XLIB graphics functions 819. Additionally, each element of the window may be translated, scaled, or rotated. The classes of functions required to make and manipulate the elements of the window are thus the following;

Element functions for creating and destroying elements;
Graphics context functions for creating, changing, and destroying graphics contexts;
Graphics functions for actually generating the elements; and
Transformation functions for scaling, rotating, and translating elements.

In a preferred embodiment, the graphics context functions and graphics functions are those provided by XLIB; the element functions are part of the code for the set values method for the drawing widget class and the transformation functions are part of the transformation code invoked by the resize method and the set values method.

Examples of an invocation of a graphics context function and an invocation of a graphics function have been already given; the following is an invocation of an element function:

XtNxCreateObject, "(chad)"

The function creates an element, and the actual argument chad is the name of the element. An invocation of a transformation function looks like this:

XtNscale, "(.5, .5)"

As indicated by its name, the function scales an element. The first argument specifies the amount by which the element is to be scaled in the x direction and the second specifies the amount by which the element is to be scaled in the y direction. The effect of the arguments .5, .5 is of course to reduce the element to ½size. The other transformation functions have corresponding arguments. In the case of the rotate function, the argument specifies degrees of rotation; in the case of the translation function, there are two arguments, the first of which specifies a translation in the x direction and the second a translation in the y direction.

The following shows how the three classes of invocations can be combined to produce the circle of window 303:

createObject, circle
translate, (.5, .5)
xDrawLine, (red, 0,0,.3,.3)
rotate, 1
xDrawLine, (red, 0,0,.3,.3)
rotate, 1
xDrawLine, (red, 0,0,.3,.3)
rotate, 1

The sequence of invocations first creates an object called "circle", then translates its center to the center of the window, and then draws a line using a previously described graphics context called "red" and rotates the line 1 degree. The sequence of drawing and rotating invocations is repeated 360 times (only 3 repetitions are shown above).

Figure 4:
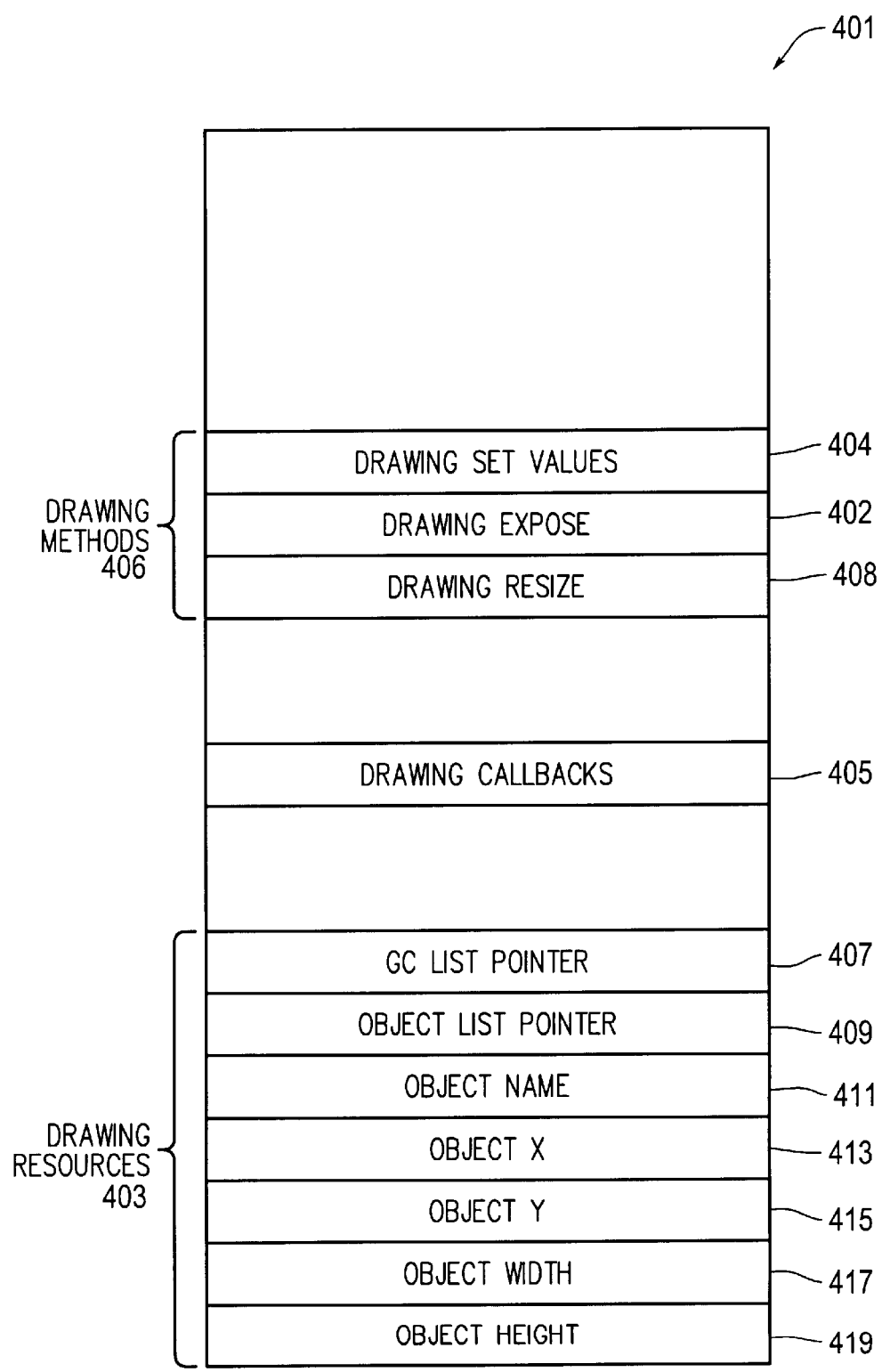
FIG. 4 shows portions of a drawing widget.

Details of Drawing Widget 401: FIG. 4

FIG. 4 shows details of drawing widget 401 which are relevant in the present context. Drawing widget 401 is a subclass of the X Toolkit's core widget class. The parts of the subclass definition which are relevant for the present discussion are the drawing methods 406, the drawing callbacks 405, and the drawing resources 403. The relevant methods in drawing methods 406 are Set Values 404, which is invoked by the intrinsic XtSetValues, Expose 402, which is invoked in response to an event message from X server 107 which indicates that the window represented by widget 401 has been uncovered and must therefore be redrawn, and Resize 408, which is invoked in response to an event message which indicates that the window represented by widget 401 has been resized and therefore must be redrawn.

Drawing callbacks 405 are functions provided by the application program using widget 401 for responding to changes in widget 401's state. In the preferred embodiment, the application program may provide a callback function which is called when a user clicks a button on mouse 139 while pointer 133 is within the window represented by the widget, a callback function which is called when the user moves pointer 133 while the mouse button is depressed, and a callback function which is called when the mouse button is depressed. In other embodiments, there may be additional or different callback functions. Examples would be callback functions which are invoked when an expose or resize event occurs.

Drawing resources 403 contain the information needed to draw the window represented by the widget 401. The items in the resources are the following:

GC List Ptr. 407 is a pointer to a list of the graphics context function invocations required to draw the widget 401's window;

Object List Ptr. 409 is a pointer to a list of the elements in the widget 401's window;

Object name 411 is the name of the first element to be drawn in widget 401's window;

Object x 413 and object y 415 are the x and y coordinates of the lower left-hand corner of the current element's bounding box in the window; and Object width 417 and object height 419 are the width and height of the current element's bounding box.

The actual information needed to draw the window is contained in the list of elements pointed to by object list pointer 409 and the list of graphics context function invocations pointed to by graphics context list pointer 407.

Figure 5:
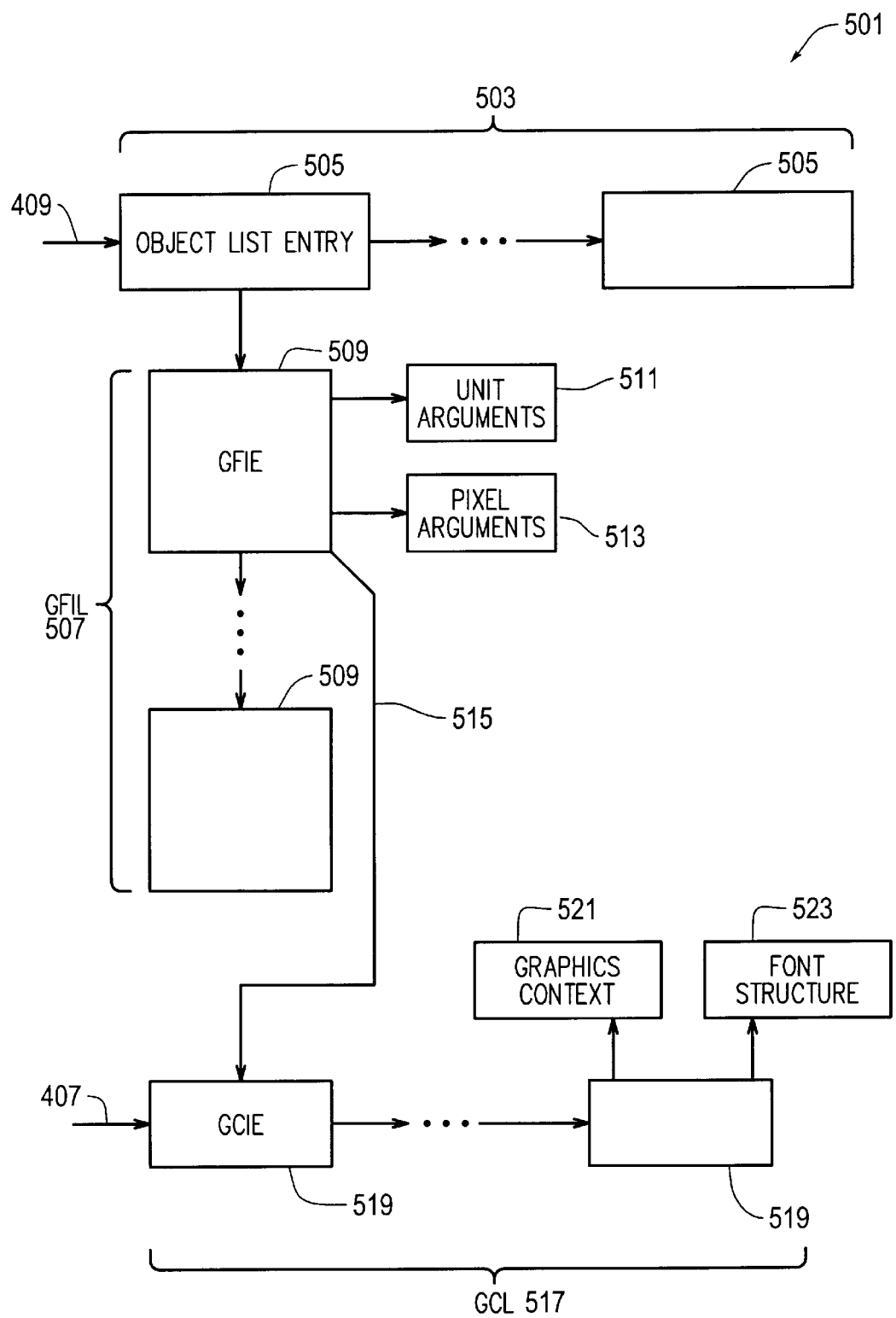
FIG. 5 shows the structure of the resource used to specify the elements of the display in a window represented by a drawing widget.
Figure 6:
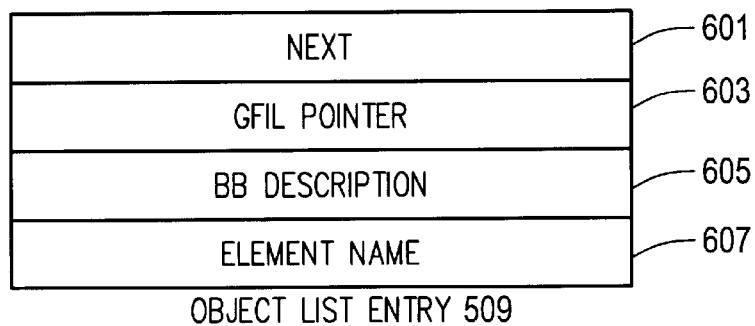
FIG. 6 shows details of the data structures used in the resource.
Figure 6:
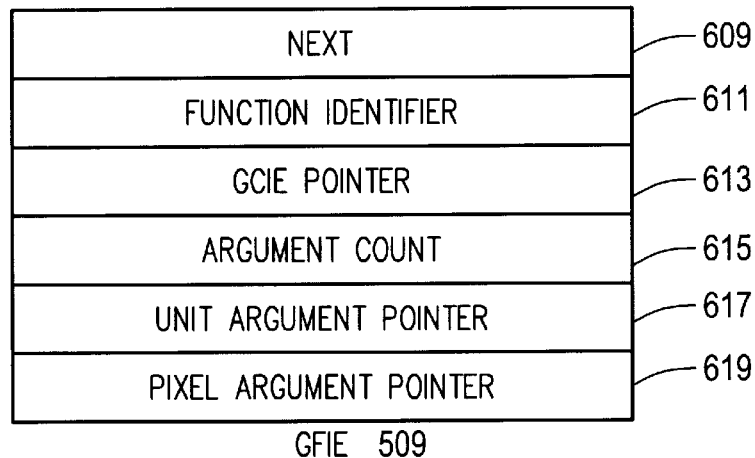
Figure 6:
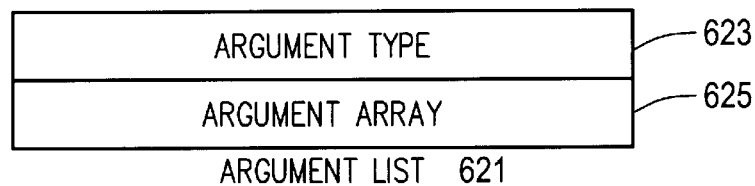
Figure 6:
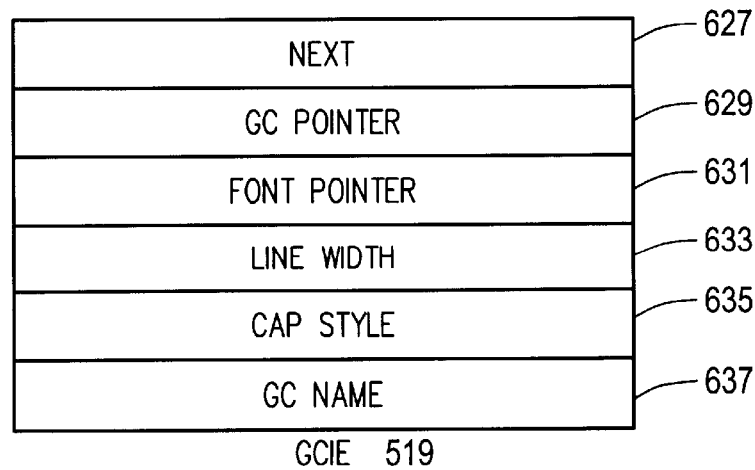

Details of the Resource Data Structures: FIGS. 5 and 6

FIG. 5 provides an overview of the data structures 501 used to represent the elements in a window. The two main components are object list 503 and context list 517. Beginning with object list 503, the list is pointed to by object list pointer 409; list 503 contains an object list entry 505 for each element in the window represented by widget 401; each object list entry corresponds to an invocation of a create element function. In the case of an object list entry 505 for a create element function, the entry 505 includes a pointer to a graphics function invocation list (GFIL) 507.

Each graphics function invocation entry 509 in list 507 represents an invocation of a graphics function. When all of the invocations represented by the list have been executed, the element represented by object list entry 505 has been drawn. If the invocation represented by an entry 509 requires a graphics context, entry 509 includes a pointer to a graphics context invocation entry (GCIE) 519 in graphics context list (GCL) 517. Each graphics context invocation entry 519 represents an invocation of a graphics context function. If the invocation contains arguments in addition to the graphics context, graphics function invocation entry 509 includes pointers to arguments 511 and if required, 513. Arguments 511 are expressed as values in the unit coordinate system; arguments 513 are translations of the unit coordinate values into the pixel values which the actual XLIB graphics functions require as arguments.

Continuing with graphics context list 517, that list is pointed to by graphics context list pointer 407 in drawing widget 401. Each graphics context invocation entry 519 represents one invocation of a graphics context function. When the invocation has been executed, the entry 519 includes a pointer to the X Window System graphics context data structure 521 resulting from the invocation and may also include a pointer to an X Window System font data structure 523. Font data structure 523 represents a font which is specified in graphics context data structure 521.

FIG. 6 is a detailed view of the components of object list 503 and graphics context list 517. Beginning with object list entry 505, the fields are the following:

Next 601 points to the next entry 505 in list 503;

GFIL pointer 603 points to the first GFIE 509 in GFIL 507 for the object list entry 505;

BB Description 605 is a data structure which includes the x and y coordinates and the width and height of the bounding box for the element represented by object list entry 505; and Element name 607 is the name of the represented element.

Continuing with graphical function invocation entry 509, the fields there are:

Next 609, which points to the next GFIE 509 in list 507;

Function Identifier 611, an integer which specifies which graphics function is being invoked;

GCIE pointer 613, which points to GCIE 519 for the graphics function;

Argument count 615, the number of arguments for the graphics function; and

Unit argument pointer 617 and pixel argument pointer 619: pointers to argument lists 621 for unit arguments 511 and pixel arguments 513 respectively.

Each argument list 621 has two parts: an argument type field 623 indicating the type of the arguments in the list, and argument array 625, which contains the arguments. The entries 519 in graphics context list 517, finally, have the following fields:

Next points to the next GCIE 519 in GCL 517;

GC pointer 629 points to the graphics context 521 produced when the graphics context function invocation represented by GCIE is executed;

Font pointer 631 is a pointer to font structure 523 for graphics context 521;

Line width 633 specifies the width of lines generated using the graphics context;

Cap style 635 specifies the manner in which the generated lines are terminated; and GC name 637 is the name of graphics context 521.

As can be seen from the foregoing discussion of FIGS. 5 and 6, data structure 501 contains all of the information needed to execute the XLIB graphics functions required to draw the elements of the window represented by drawing widget 401. An important characteristic of data structure 501 is that the character string information contained in each of the invocations 804 is reduced to integer values, pointer values, and floating point values to increase the speed with which the data structures 501 are processed.

For example, an invocation of XtNxDrawLine includes the character string for the function's name, the character string for the name of its graphics context, and character strings representing the coordinates which define the line. In the graphics function invocation entry 509 for the invocation, XtNxDrawLine is replaced by a function identifier 611 whose value is an integer which uniquely identifies that XLIB graphics function, the name of the graphics context is replaced by GCIE pointer 613, and the coordinates are represented by floating point values in argument array 625 of unit arguments 511. In a preferred embodiment, the translations from character string names to integers and pointers is done by means of well-known techniques involving hash functions, while the translations from character string representations of numbers to floating point values are done using built-in functions provided by the well-known UNIX operating system (UNIX is a registered trademark of Unix System Laboratory).

Figure 7:
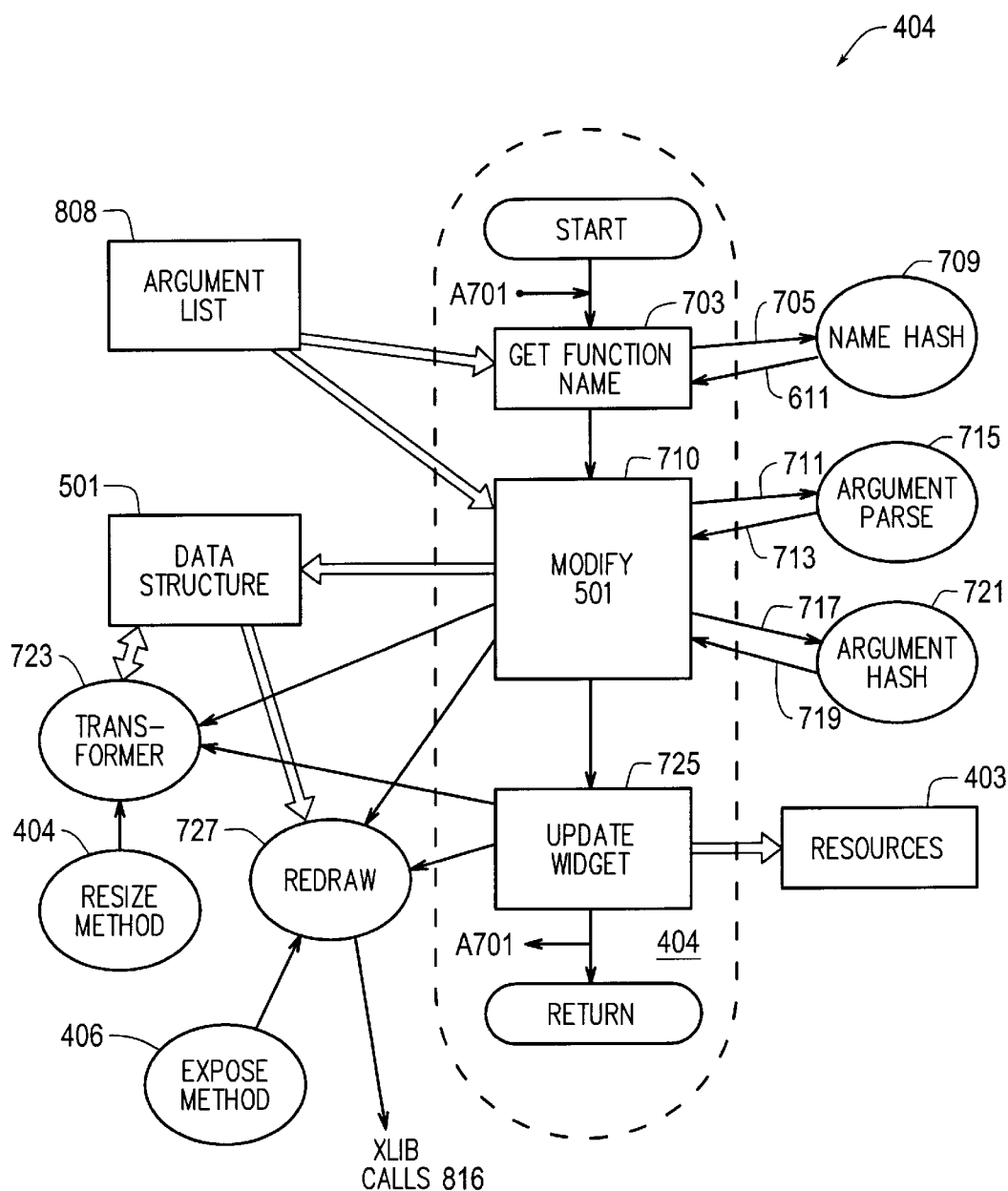
FIG. 7 shows details of the set values method in the preferred embodiment.

Detailed Description of Operation of Drawing Widget 401: FIG. 7

In a preferred embodiment, the work of creating and maintaining data bases 501 is performed by set values method 404; FIG. 7 presents a detailed representation of the operation of set values method 404. In the figure, flow of control is represented by single-line arrows and flow of data is represented by double-line arrows; processing elements are represented by ovals and data structures by rectangles.

In overview, set values method 404 executes as a loop 701 which processes the invocations 804 placed by XtSetArg into argument list 808 until all of the invocations 804 have been processed. There are three main steps involved in processing the invocations: get function name 703, which gets the name of the function being invoked, modify data structure 501 710, and update widget 725.

Beginning with get function name 703, the function name 705 is obtained and translated by name hash 709 into function identifier 611 representing the function specified in the invocation. The next step, 710, performs the processing required for invocations of the function identified by function name 705. Step 710 is implemented as a case statement, with a case for each of the functions for which widget 401 performs actions. In each case, each argument in invocation 804 is parsed in turn. The parsing is done by argument parse function 715, which returns the parsed arguments to the case processing the invocation. If an argument is a name, the name is hashed by argument hash function 721, transforming argument 717 into a small integer 719. Numbers are converted from strings to numerical values by means of standard conversion functions. As argument values are received, they are written to data structure 501.

Each case modifies data structure 501 as required for the invocation 804 being processed. For example, if the invocation 804 specifies a create element function, the case for the function creates an object list entry 505 for the new element; the new entry 505 goes to the end of object list 503. If the invocation 804 specifies a destroy element function, the case for the function removes object list entry 505 and its associated graphics function invocation list 507 from data structure 501. In the same manner, an invocation 804 of a graphics context function which creates a graphics context results in the addition of a graphics context invocation entry 519 to graphics context list 517; an invocation 804 of a graphics context function which modifies a graphics context creates a new graphics context 521 for an existing graphics context invocation entry 519, and an invocation 804 of a graphics context function which deletes a graphics context results in the removal of the graphics context from graphics context list 517.

When the invocation 804 is a graphics function, the result of its processing by part 710 of set values method 404 is the addition of a graphics function invocation entry 509 for one of the XLIB graphics functions to the end of graphics function invocation list 507; unit args 511 and the pointer to graphics context information entry 519 are set from the values in the invocation. Again, hashing is used to convert the name of the graphics context in the invocation to the pointer to its graphics context invocation entry 519. Invocations 804 for transformation functions are treated in the same fashion as invocations of graphics functions.

The last part of set values method 404 updates drawing widget 401. The first step here is updating the window to represent the changes made in the resource. To do this, set values method 404 calls transformer function 723 and redraw function 727 if the window represented by drawing widget 401 has been created and updates fields 411-417 in drawing resources 403 by copying the information in those fields from the corresponding fields of the current entry in object list entry 505.

The first step in updating the window is to compute the pixel values for the arguments of the graphics function. As part of computing the pixel values, the values of the arguments in an element's graphics function invocations are modified as required by any transformation function invocations specified for the elements. Computation of the pixel values is done by transformer 723, which processes graphics function invocation list 507 for each element on object list 503 in turn. Each invocation list 507 is processed in order. When a graphics function invocation list entry 509 for a transformation function is processed, transformer 723 computes is what transformations are necessary and places the results in a data structure. The contents of the data structure are then used to set pixel arguments 513 in each graphics function invocation entry 509 for an XLIB graphics function as required for the transformation; the unit arguments 511 are left unchanged.

Redraw function 727 uses data structure 501 to generate the elements specified in data structure 501 in the window corresponding to drawing widget 401. Redraw function 727 reads through graphics function invocation list 507 for each object in turn. With each graphics function invocation entry 509 which represents an XLIB graphics function invocation, expose method 406 invokes the graphics function represented by the entry with the graphics context specified by graphics context pointer 629 and the argument values specified in pixel arguments 513. As a result, each element in the window appears as specified in the graphics function invocation list for the element. As shown in FIG. 7, set values method 404 further uses redraw function 727 and transformer function 723 to update the window when it processes element function invocations.

FIG. 7 further shows how resize method 404 uses transformer function 723 when the window is resized to scale the elements to fit the newly-resized window. The effects of the resizing are computed and placed in the data structure, and then transformer function 723 proceeds as described above. Window 305 of FIG. 3 was produced by such a resizing operation. FIG. 7 also shows how expose method 406 uses redraw function 727 to redraw the window in response to an expose event. Direct execution of transformer 723 and redraw 727 by set values method 404 permits incremental updating of the elements in the window, while the fact that expose method 406 executes only redraw 727 greatly increases the efficiency of the drawing operation.

CONCLUSION

The foregoing Detailed Description has disclosed to those of ordinary skill in the art how to make and use a drawing widget in the X Window System. The principles of the invention disclosed herein are restricted neither to the drawing widget nor to the X Window System, but may be applied generally in systems for constructing graphical user interfaces and in systems employing compiled objects.

As regards the drawing widget itself, it will be immediately apparent to those skilled in the art that many other embodiments are possible. For example, the syntax of the invocations will be determined by the functions being invoked. Further, the techniques used to set the resource will depend on the programming system in which the object is implemented. Additionally, though the data structures used in the preferred embodiment are particularly advantageous, other data structures may be employed as well. The types of entries in the data structure and their contents are of course dependent on the system in which the object is implemented and will vary with the system. In other embodiments, other systems of representing coordinates may be used and of course the techniques used for rotation, translation, and scaling will be modified as required for those systems.

Because the Detailed Description is intended to provide an example embodiment of a generic invention, and because the example embodiment is only one of many possible implementations in many different object-oriented programming systems and only one of many implementations of a drawing widget, the Detailed Description is to be considered to be in every respect illustrative and exemplary, and not restrictive, and the scope of the invention is to be determined solely from the attached claims, which are to be given the broadest interpretation permitted by the patent law.

What is claimed is:

1. A widget contained in memory means usable in a computer system that is implementing a windowing system, the widget representing a window displayed in the windowing system and the widget comprising:

means which when executed in the computer system at runtime set a resource of the widget to one or more invocations of arbitrary functions of a set thereof; and means which when executed in the computer system in response to a change in the widget employ the invocation to execute a function of the set of arbitrary functions specified in the invocation.

2. The widget set forth in claim 1 wherein:

the functions include primitive functions provided by the windowing system.

3. The widget set forth in claim 1 wherein:

the functions include at least one function which modifies the invocations to which the resource is set.

4. The widget set forth in claim 3 wherein:

the at least one function modifies the number of invocations to which the resource is set.

5. The widget set forth in claim 3 wherein:

the at least one function modifies an argument in an invocation to which the resource is set.

6. The widget set forth in any of claims 2, 3, 4, or 5 wherein:

the functions include graphics primitive functions; and the mean which employ the invocation executes any graphics primitive function specified by the invocation when the window is exposed.

7. The widget set forth in any of claims 1, 2, 3, 4, or 5 wherein:

the means which set the resource orders the invocations to which the resource is set; and the means which employ the invocation executes the invocations to which the resource is set as ordered.

8. The widget set forth in any of claims 1, 2, 3, 4, or 5 wherein:

the one or more invocations include character string data;

the means which set the resource further includes means for translating the character string data into data of another type; and the invocations to which the resource is set include the data of the other type in place of the character string data.

9. The widget set forth in claim 1 wherein:

the functions include graphics primitive functions provided by the windowing system.

10. The widget set forth in claim 9 wherein:

the invocations of the graphics primitive functions include arguments specifying coordinates according to a first system; and the means which employ the invocation includes means for changing the arguments so that the arguments specify coordinates according to a second system required for the graphics primitive functions.

11. The widget set forth in claim 9 wherein:

the functions include transformation functions; and the means which employ the invocation includes means for transforming the arguments in the invocations of the graphics primitive functions, the means for transforming being responsive to the transformation functions.

12. The widget set forth in claim 11 wherein:

the transformation functions include a rotation function, a translation function, and a scaling function.

13. The widget set forth in claim 11 wherein:

the invocations of the graphics primitive functions include arguments specifying coordinates according to a first system; and the means for transforming includes means for changing the arguments so that the arguments specify coordinates according to a second system required for the graphics primitive functions.

14. The widget set forth in claim 11 wherein:

the means for transforming is further responsive to any resizing of the window.

15. The widget set forth in claim 9 wherein:

the means which employ the invocation includes means responsive to any resizing of the window for transforming the arguments in the invocations of the graphics primitive functions as required by the resizing.

16. The widget set forth in claim 9 wherein:

the window includes one or more graphical elements;

the functions include a function for establishing a graphical element; and the means which set a resource responds to an invocation of the function for establishing a graphical element by relating the invocations of the graphics primitive functions necessary to create the element to the element.

17. The widget set forth in claim 16 wherein:

the means which set a resource relates the invocations of the graphics primitive functions to the element by creating a data item for the element in response to the function for establishing a graphical element, creating a data item for each invocation of a graphics primitive function needed to create the element, and relating the data items for the invocations of the graphics primitive function to the data item for the element.

18. A compiled object contained in memory means usable in a computer system that is implementing a system which uses the compiled object and the compiled object comprising:

means which when executed in the computer system receive one or more invocations of functions in the object at runtime, the functions being accessible to the computer system, and storing the one or more invocations in storage means accessible to the computer system; and means which when executed by the computer system employ the stored invocations to execute one or more of the functions as required for operation of the object.

19. The object set forth in claim 18 wherein:

the functions include at least one function provided by an environment in which the object is used.

20. The object set forth in claim 18 wherein:

the functions include at least one function which modifies the stored invocations.

21. The object set forth in claim 20 wherein:

the at least one function modifies the stored invocations by modifying the number of stored invocations.

22. The object set forth in claim 20 wherein:

the at least one function modifies the stored invocations by modifying an argument in at least one of the stored invocations.

23. The object set forth in any of claims 18 through 22 wherein:

the means which receive the one or more invocations orders the invocations in the stored invocations; and the means which employ the stored invocations executes the stored invocations as ordered.

24. The object set forth in any of claims 18 through 22 wherein:

the one or more invocations received by the means for receiving include character string data;

the means which receive further includes means for translating the character string data into data of another type; and the stored invocations include the data of the other type in place of the character string data.

25. A drawing widget contained in memory means usable in a computer system that is implementing an X Window System, the drawing widget representing a window in the X Window System that contains one or more graphics elements, the drawing widget being characterized by:

a set values method which when executed in the computer system sets a resource of the widget to one or more invocations of functions accessible to the computer system, the functions belonging to a set thereof including at least an XLIB graphics function; and an expose method which when executed by the computer system produces the element in the window by employing the one or more invocations in the resource to execute functions from the set thereof.

* * * * *